United States Patent Office 3,736,271
Patented May 29, 1973

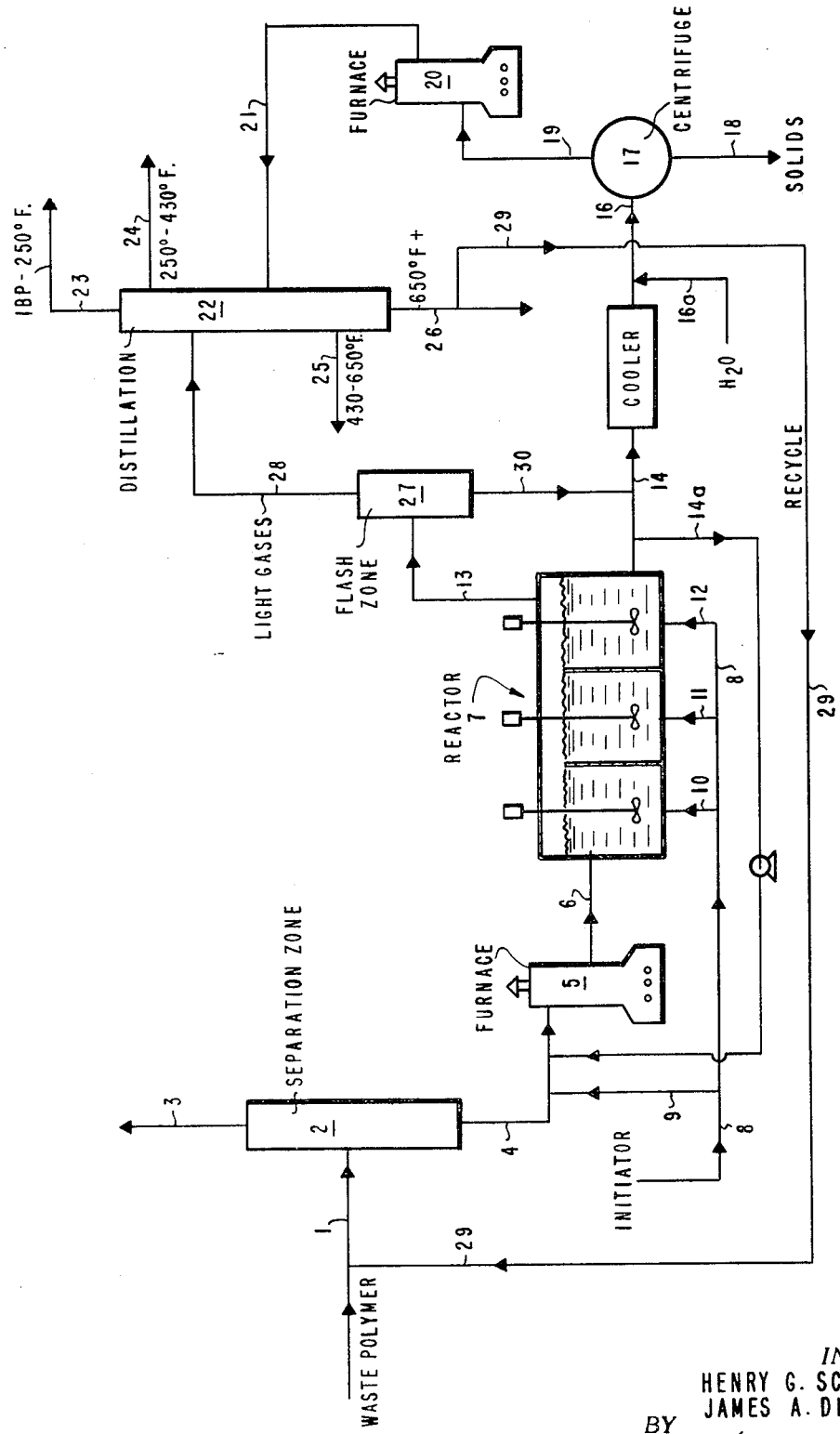

3,736,271
CONVERSION OF WASTE POLYMERS TO USEFUL PRODUCTS
Henry G. Schutze and James A. Dinwiddie, Baytown, Tex., assignors to Esso Research and Engineering Company
Filed Dec. 24, 1970, Ser. No. 101,227
Int. Cl. C08f 47/24
U.S. Cl. 260—2.3                          13 Claims

ABSTRACT OF THE DISCLOSURE

Waste polymers which heretofore have been buried, burned, or otherwise disposed of with effects on the ecology are converted to useful products by converting the polymer into a liquid state either by heating the polymer to a temperature above its melting point or dissolving the polymer in a suitable solvent and then initiating a free radical decomposition reaction by the addition of a suitable initiator. Inorganic materials in the polymer are removed while the polymer is in the liquid state by centrifugation, settling, filtration or solvent washing.

BACKGROUND OF THE INVENTION (1) Field of the invention.—The present invention is directed to a process for conversion of waste polymers, especially those containing high concentrations of inorganic material which prevent their reuse in normal end-use applications of the polymer, and which, heretofore, have been buried, burned, or otherwise disposed of, which comprises converting the polymer to a liquid state and introducing into the polymer sufficient free radical initiators to decompose the polymer and while the polymer is in its liquid state separating the inorganic material which may be present.

(2) Prior art.—U.S. 3,013,003; U.S. 3,144,436; U.S. 3,201,381; U.S. 3,316,231.

SUMMARY OF THE INVENTION

The present invention is directed to converting waste polymers, especially those containing high concentrations of inorganic material or because of other contamination cannot be reused, into a number of useful products. The process comprises converting the polymer into a liquid state and degrading the polymer by mixing with a free radical initiator which may be aided by heat and oxygen to form a decomposition solution and separating from the decomposition solution the inorganic materials present.

BRIEF DESCRIPTION OF THE DRAWING

FIG. 1 is a schematic view of one embodiment for converting a waste polymer to useful products.

DESCRIPTION OF THE PREFERRED EMBODIMENTS

Waste polymers, especially those containing high concentrations of inorganic material, have been burned, buried, or otherwise disposed of in a manner which effect the ecology. The present invention is directed to a process for converting waste polymers to useful products; the process being generally applicable to such polymers as the $C_2$ to $C_8$ poly-alpha-mono-olefins such as polypropylene, polybutene, and poly-4-methylpentene-1; butyl rubber; ethylene-propylene rubber (EPR); ethylene-propylene terpolymers (EPT); polyvinylchloride (PVC); polystyrene; and other polymers subject to a $\beta$-fission reaction in the presence of a free radical initiator. Waste polymers of the foregoing which contain high concentrations of inorganic material may be illustrated by the soluble fraction of polyolefins containing high concentrations (over 0.5 wt. percent) of the Ziegler catalysts, salts of titanium, vanadium, aluminum, etc. which are obtained from the de-ashing operation; polymers such as polyolefins or butyl rubbers containing high concentrations of inorganic pigments such as polypropylene pigmented with a metal (0.01 to 2.0 wt. percent) or filled with silica, fiber glass, or asbestos (up to 40–50 wt. percent); polymers which have been in contact with caustic, NaCl or other salts wherein the contaminate cannot be removed because of its encapsulation by the polymer; or polymers such as a polyolefin or butyl rubber which has been contaminated by dirt, metal bits and scraps, glass or material swept up from a floor or the ground. Waste polymers of the foregoing nature cannot be reused and hence, heretofore, posed a problem in their disposal.

According to the present invention, waste polymers are converted to useful products. The polymer is first converted to the liquid state by heating the polymer above its melting point or by dissolving the polymer in a suitable solvent. To convert a polymer such as butyl rubber into a liquid state, it may first require that the polymer be cut or chipped up and/or extruded. In the event the polymer requires no mechanical treatment, the polymer may be heated above its melting point in a furnace. A solvent may be used with the polymer and admixed therewith prior to or during heating. The solvent may be chosen having a boiling point either above or below the decomposition solution obtained from degrading the polymer. Solvents may be selected wherein the polymers are highly soluble to aid in converting the polymer to the liquid state as well as those which aid in reducing the viscosity of the polymer in the liquid state and the decomposition solution. Hence, suitable solvents may be aliphatic, alicyclic, aromatic or mixtures thereof; however, if an aromatic solvent is used, the aromatic solvent may react during the degradation of the polymer and the decomposition solution will contain reaction products of the aromatic solvent. Illustrative of suitable solvents are the aliphatic and naphthenic solvents boiling between 200° and 550° F., the heavy alkyd fractions (some of which are hydrofined and clay treated for solvents used in producing polymers such as Isopar C), are microcrystalline waxes, the waxes from cycle stock which are primarily n-paraffins, an alicyclic solvent such as cyclohexane, and aromatic solvents such as benzene, toluene, xylenes, naphthalenes, and the like.

After the polymer has been converted to the liquid state, a separation zone may be provided, if necessary or desirable. The separation zone may be a simple screen or filter if the waste polymer is from a trash or garbage incinerator wherein the polymer and such materials as glass, metal, rocks and the like would not burn. Thus, the screen or filter would be used to remove any solids from the polymer in the liquid state. If the waste polymer feed-contained solvents or is admixed with other liquids, the separation zone may be a simple flash tower or distillation column for separating such liquids from the polymer. The amounts of materials other than polymers which may remain with the polymer may vary over a large range. The primary factor as to the amount of other materials being present with the polymers being converted to useful products according to the present invention will be the desired nature of the products obtained from the process of the present invention. The presence of water, in most instances, does not undesirably affect the nature of the products obtained and may be present; however, the presence of water may cause corrosion problems if not considered in choosing the materials of construction.

The polymer after being converted into the liquid phase is then decomposed by admixing with a free-radical initiator. The initiator is admixed with the polymer in a reactor, preferably in a reactor which approximates plug flow so that all the polymer is degraded. Suitable initiators are aromatic sulfides, disulfides, and mercaptans such as xylyl mercaptan (such as Du Pont's RPA No. 2), toluene disulfide, and thiobisphenols, e.g., 4,4;-thiobis (2-t-butyl-5-methylphenol). Various aromatic and aliphatic peroxides may be used as initiators such as cumene hydroperoxide, t-butyl peroxide, t-butyl hydroperoxide, etc.

Air or oxygen may be introduced into the polymer in the liquid state as a means of inducing the decomposition or the β-fission reaction. It is preferred, however, to use an aromatic sulfide or disulfide as these represent the most controllable and safest means of achieving the degradation reaction. Aromatic disulfides recoverable from catalytic cracking operations are very satisfactory for the initiator for the present invention. The degradation of the polymer is carried out to a degree sufficient to reduce the viscosity of the polymer so that the inorganic materials such as the salts of titanium, vanadium, or aluminum may be removed from the polymer. The liquid polymer may also contain such material as NaCl and NaOH, although these are insoluble in the polymer, they cannot be removed because of their encapsulation by the polymer until the polymer has been substantially degraded.

After the polymer has been substantially degraded and decomposed, the polymer is cooled and the inorganic materials are removed. The separation of the inorganic material may be by centrifugation, settling, filtration, or solvent washing. After the inorganic materials are separated, the decomposed polymer may be heated and separated, if desired, into various useful products, such as by distilling into useful fractions.

Referring to FIG. 1 of the drawings, a preferred embodiment is disclosed wherein a polypropylene slurry is converted into useful products. To illustrate all ramifications of the present invention, the polypropylene slurry is in admixture with a solvent. This slurry is introduced by line 1 into a distillation column 2 at a temperature of about 390° F. and the slurry contains approximately 2/1 polypropylene to solvent. If the solvent is present in sufficient amount to have value when recovered or if the solvent leads to undesirable end products, the solvent is removed overhead by line 3 by distilling at temperatures of about 450° to 500° F. The polymer, either essentially free of solvent or with small amounts of solvent if the solvent does not lead to undesirable end products, is removed by line 4 and introduced into a furnace 5. A recycle stream may be required to aid in the removal of the polymer from the bottom of the distillation column 2 and reduce the viscosity of the polymer sufficiently so that the polymer may be pumped to the furnace 5. The polymer is heated in the furnace 5 up to temperatures with the range of 550° to 900° F. or higher, preferably 600° to 700° F., and then introduced by lines 6 to a three-stage reactor 7. The reactor 7 is illustrated having three stirring sections to approach a plug flow reactor, although other configurations may be used. Initiator is introduced by line 8 to the reactor 7. It may be preferred to add initiator by line 9 before the polymer is introduced to furnace 5. If added through line 9, initiator may be added in an amount between about 0.5 and 5.0 percent, preferably 1 to 3 percent, by weight based on the polymer. Initiator, preferably a sulfide or disulfide and more specifically toluene disulfide, may be added to each section of the reactor 7 by lines 10, 11 and 12 respectively. Initiator may be added to each section in an amount between about 0.5 and 5.0 percent by weight.

The conditions in the reactor 7 may be maintained at a temperature between 550° and 900° F., preferably the temperatures may be maintained between 600 and 700° F. The total time for the polymer to be maintained in reactor 7 is from about one to four hours depending on the nature of the useful products desired. During this time, decomposition of the polymer occurs and in some instances with some light gases being formed which may be removed from reactor 7 by line 13. The polymer after it has been decomposed in reactor 7 is removed as a decomposition solution by line 14. Since the reaction is endothermic, some of the decomposition solution is recycled from the reactor 7 through line 14a and returned to the furnace 5 in order to maintain the desired temperature in the reactor 7.

The polymer, after it has been decomposed in reactor 7, is removed as a decomposition solution by line 14 and passed to a cooler 15 wherein the reaction solution is cooled. In the case of polypropylene, cooling may be at a temperature of about 150 to 250° F. and any pressure buildup reduced to a range of about 50 to 100 p.s.i.g. After the decomposition solution is cooled, it is passed by line 16 to a means for separating the inorganic material, which is preferably a solid bowl centrifuge 17 wherein the inorganic solids are separated and removed by line 18. The polymer in the liquid state is removed by line 19 which may contain therein an electrical desalter (not shown) to remove any inorganic solids not removed by the centrifuge 17, where it may be heated in a furnace 20 and passed by line 21 to a distillation column 22. In the distillation column 22, various fractions may be obtained such as for the purpose of illustration the fraction up to 250° F., a fraction of 250° to 430° F. boiling point, another fraction of 430° F., and if desired a fraction above 650° F. These separate fractions are removed by line 23, 24, 25 and 26 respectively.

The gases which are removed from the reactor 7 by line 13 may be introduced into a flash vessel 27 wherein the light gases are removed by line 28 and introduced into the distillation column 22. The fraction boiling above 650° F. may be used as a recycle stream and solvent for the process and accordingly recycled by line 29. Any liquid which is obtained in the flash vessel 27 may be removed by line 30 to be introduced back into line 14 to aid in the pumping of the decomposition solution or to aid in reducing the viscosity of the decomposition solution.

The present invention will be further illustrated by the following specific examples which are given by way of illustration and not as limitation on the scope of the invention.

Example 1

Six hundred fifty gms. of dry amorphous polypropylene (containing about 10% ash on a dry basis) in admixture with about 2/1 solvent was added to a round bottom glass flask equipped with about a 1 foot column (no plates) and a conventional water condenser. Essentially all the solvent was removed by distillation at atmospheric pressure below about 450° F. Heating was continued to about 550° F. while continuing to stir the viscous molten polymer. At this temperature, the dropwise addition of

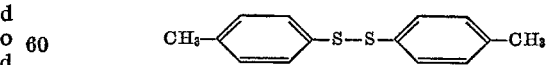

toluene disulfide was started. The viscosity of the molten polymer immediately decreased. Heating was continued to about 645° F. where reaction rate appeared to be appreciable. As reaction rate decreased, more toluene disulfide initiator was added to furnish an additional supply of free radicals. In this specific example, it is observed from Table I which follows that about 53% of the polymer was distilled overhead. Reaction was arbitrarily terminated at this point; the residue was filtered, and the precipitate was washed with petroleum ether. Yields and skeletal analyses of the various products are indicated in Table I. Note that essentially all the organic reaction product was volatile.

TABLE I

React at 645° F. for 1½ hrs. with 8% initiator. Distillate removed as formed

| 305 gms. (47%) bottoms | | | | | | 345 gms. (53%) overhead | |
|---|---|---|---|---|---|---|---|
| | Filtered and washed with petroleum ether | VI=71 | | | | | |
| 108 gm. (17%) solid | 197 gm. (30%) oil | GC dist., percent off. | ° F. | GC dist., percent off. | ° F. | | |
| Analysis: 68% Ash. 25% organic (C+H). 25% organic (C+H). 7% H₂O (diff.). | Gravity: 37.4° API; 8378 sp. gr. Vis. at— 100° F. 55.25 cs. (256.3 SSU). 210° F. 6.6 cs. (47.8 SSU). | 11 30 80 90 99.9 | 599 700 903 985 1,106 | 10 50 95 FBP Peroxide No. 6.5 | 220 426 623 750 | FIA analysis of a similar total OH sample: 81% olefins; 19% aromatics. | |

One of the main purposes of this experiment was to show that the inorganic solids could be removed by centrifugation if the viscosity of the polymer was reduced sufficiently. In a separate experiment, samples of the overhead product and bottoms slurry were blended in the ratio of production and centrifuged in an ordinary laboratory centrifuge for 5 minutes at 180° F. A clear supernatant liquid was obtained, although the volume of cake indicated its porosity to be about 60%. The cake was observed to be quite fluffy by feel; it resembled talcum powder. Furthermore, microscopic examination of the slurry indicated the particles to be smaller than 5–10 microns. Most of the oil may be removed from the porous portion of the solid by a properly designed centrifuge. An alternate method would be to add just a little water either to the total stream just ahead of the centrifuge or within the centrifuge in sufficient amount to convert the fluffy cake to a sort of thick mud.

Example 2

A polypropylene slurry containing about 10% ash on a dry basis (major elements being Cl, Na, Al and Ti) in admixture with xylenes was treated according to the present invention and similarly as in Example 1 using the same initiator but the following conditions:

Polypropylene slurry, gms. ---------------- 7300
Xylenes removed, gms. ------------------- 2712
Xylene freed polymer, gms. -------------- 4588
Reaction conditions: [1]
    Pressure, p.s.i.g. ----------------------- 400
    Time at 650° F., min. ------------------ 75
Total initiator (wt. percent polymer 2.2), gms. --- 102
Product (Yields based on polymer+initiator):
    Condensate:
        Gms. ------------------------------- 350
        Wt. percent ------------------------ 7.5
    Total recovered decomposition solution:
        Gms. ------------------------------- 4095
    Total recovery:
        Gms. ------------------------------- 4445
        Wt. percent ------------------------ 94.8
    Total filtrate: [2]
        Gms. ------------------------------- 3470
        Wt. percent ------------------------ 74
    Total solids, hexane washed:
        Gms. ------------------------------- 625
        Wt. percent ------------------------ [3] 13.3

[1] At 650° F.; N₂ rate about 8 l./hr.; initiator added incrementally at approx. 15 min. intervals; stirring rate about 200 r.p.m.
[2] Includes oil washed from solid.
[3] Contains 25% polymer, based on C and H analysis.

TABLE II

Inspections on Fltrate and Yields of Example 2

| | 280–430° | 430–650° | 650° F.+ | Total |
|---|---|---|---|---|
| Volume percent | 20.2 | 12.9 | 66.9 | |
| Weight percent | 21.1 | 12.5 | 67.4 | |
| Yield | 14.9 | 9.3 | 49.8 | |
| Gravity, ° API | 36.6 | 40.1 | 34.8 | 35.2 |
| Sulfur, wt. percent | 0.76 | 1.01 | 0.07 | 0.33 |
| Vis at— | | | | |
|   100° F., cs./SSU | | | | Viscous |
|   210° F., cs./SSU | | | 40/188 | 13.24/71.2 |
| VI | | | | |
| Clay gel: | | | | |
|   Saturate plus olefins | | | | 73.3 |
|   Aromatics | | | | 73.3 |
|   Aromatics | | | | 26.3 |
|   Polars | | | | 0.4 |

Example 3

A polypropylene slurry containing about 10% ash on a dry basis (major elements being Cl, Na, Al, and Ti) in admixture with xylenes was treated according to the present invention and similarly as in Example 1 using the same initiator but the following conditions:

Polypropylene slurry, gms. ---------------- 7390
Xylenes removed, gms. ------------------- 2840
Xylene freed polymer, gms. -------------- 4550
Reaction conditions: [1]
    Pressure, p.s.i.g. ----------------------- 400
    Time @ 650° F. min. -------------------- 120
Total initiator (wt. percent polymer, 3.8), gms. --- 170
Product (Yields based on polymer+initiator):
    Condensate:
        Gms. ------------------------------- 147
        Wt. percent ------------------------ 3.1
    Total recovered decomposition solution, gms. ---- 4150
    Total recovery:
        Gms. ------------------------------- 4297
        Wt. percent ------------------------ 91.0
    Total filtrate: [2]
        Gms. ------------------------------- 3662
        Wt. percent ------------------------ 77.6
    Total solids, hexane washed:
        Gms. ------------------------------- 488
        Wt. percent ------------------------ 10.3

[1] @ 650° F.; N₂ rate about 8 l./hr.; initiator added incrementally at approx. 15 min. intervals; stirring rate about 200 r.p.m.
[2] Includes oil washed from solid.

TABLE III
Inspections on Filtrate and Yields of Example 3

|  | 273–430° | 430–650° | 650° F.+ | Total |
|---|---|---|---|---|
| Volume percent | 19.8 | 13.9 | 66.3 | |
| Weight percent | 19.6 | 13.9 | 66.5 | |
| Yield | 15.2 | 10.8 | 51.6 | |
| Gravity, ° API | 38.0 | 36.4 | 35.5 | 35.1 |
| Sulfur, wt. percent | 1.4 | 1.9 | 0.15 | 0.7 |
| Vis. at— | | | | |
| 154° F., cs./SSU | | | 319/6,870 | |
| 210° F., cs./SSU | | | 68.24/318 | |
| VI | | | | |
| Clay gel: | | | | |
| Saturate plus olefins | | | 91.0 | |
| Aromatics | | | 7.6 | |
| Polars | | | 1.4 | |

Example 4

A polypropylene slurry containing about 10% ash on a dry basis (major elements being Cl, Na, Al, and Ti) in admixture with xylenes was treated according to the present invention and similarly as in Example 1 using the same initiator but the following conditions:

| | |
|---|---|
| Polypropylene slurry, gms. | 7715 |
| Xylenes removed, gms. | 3085 |
| Xylene freed polymer, gms. | 4630 |
| Reaction Conditions:[1] | |
| Pressure, p.s.i.g. | 400 |
| Time @ 650° F., min. | 180 |
| Total initiator (wt. percent polymer, 5.8), gms. | 267 |
| Product (Yields based on polymer+initiator): | |
| Condensate: | |
| Gms. | 173 |
| Wt. percent | 3.5 |
| Total recovered decomposition solution, gms. | 4440 |
| Total recovery: | |
| Gms. | 4613 |
| Wt. percent | 94.2 |
| Total filtrate:[2] | |
| Gms. | 3975 |
| Wt. percent | 81.2 |
| Total solids, hexane washed: | |
| Gms. | 465 |
| Wt. percent | [3] 9.5 |

[1] @ 650° F.; N² rate about 8 l./hr.; initiator added incrementally at approx. 15 min. intervals; stirring rate about 200 r.p.m.
[2] Includes oil washed from solid.
[3] Ash content=0.00044%.

TABLE IV
Inspections on Filtrate and Yields of Example 4

|  | 150–430° | 430–650° | 650–920° | 920°+ | 650° F.+ | Total |
|---|---|---|---|---|---|---|
| Volume percent | 24.2 | 16.3 | 24.3 | 35.2 | 59.5 | |
| Weight percent | 24.1 | 16.1 | | | 59.7 | |
| Yield | 19.6 | 13.1 | | | 48.5 | |
| Gravity, ° API | 39.1 | 36.3 | | | 35.3 | 36.4 |
| Sulfur, wt. percent | 1.2 | 1.8 | | | 0.3 | 0.9 |
| Vis. at— | | | | | | |
| 100° F., cs./SSU | | | | | 270/1,250 | 14.4/75 |
| 210° F., cs./SSU | | | | | 21.9/107 | 3.6/38 |
| VI | | | | | 106 | |
| Clay gel: | | | | | | |
| Saturate plus olefins | 21 | 40 | | | | 62.9 |
| Aromatics | 57 | 34 | | | | 36.1 |
| Polars | | | | | | 1.0 |
| Olefins | 22 | 26 | | | | |

GPC analysis of the aromatic cut from the 150°–430° F. fraction from Example 4 showed it to be comprised mainly of xylenes. Thus, all of the xylenes were not removed prior to initiating the decomposition reaction. Furthermore, the aromatics in the 430°–650° F. cut proved to be alkylated xylenes in the following relative amounts:

| | |
|---|---|
| $C_8$ | 5.3 |
| $C_9$ | 1.1 |
| $C_{10}$ | 0.8 |
| $C_{11}$ | 3.6 |
| $C_{12}$ | 3.0 |
| $C_{13}$ | 2.5 |
| $C_{14}$ | 6.9 |
| $C_{15}$ | 3.0 |
| $C_{16}$ | 1.8 |
| $C_{17}$ | 4.4 |
| $C_{18}$ | 1.4 |
| $C_{19}$ | 0.9 |
| $C_{20}$ | 1.1 |

The presence of aromatics of consecutive C. (carbon) numbers indicates that alkylation occurs in the decomposition reaction of the present invention. Thus, if aromatic solvents are present some long chain alkylation of the original aromatic solvent may occur. On the other hand, if alkylated aromatics are not desired in the products of the process of the present invention then it will be necessary to have an effective separation of the aromatic from the polymer such as in the first distillation tower.

Example 5

A polypropylene slurry (containing about 10% ash on a dry basis) was admixed with a solvent 150 N CS (an approximately 150 vis. oil from a solvent extracted and dewaxed cycle stock) and toluene disulfide as the initiator as follows:

| | Gms. |
|---|---|
| Polypropylene slurry | 7195 |
| 150 N CS | 2159 |
| Initiator | 278 |
| | 9,632 |

The xylenes present in the slurry were removed by distillation (2573 gms.). The polymer and initiator less xylenes were then heated to approximately 650° F. at 400 p.s.i.g. using a nitrogen blanket. Additional initiator was added periodically over the reaction time of 180 minutes. The decomposition solution was filtered resulting in a solid precipitate (482 gms.) and a filtrate (5716 gms.). The solid precipitate contains the undesired inorganic solids. The inspections on the filtrate are set forth in Table V which follows.

TABLE V

|  | 200–430° | 430–650° | 650° F.+ | Typical 150 N CS |
|---|---|---|---|---|
| Gravity, ° API | 31.8 | 31.3 | 34.4 | |
| Volume, percent | 3.3 | 7.4 | 89.3 | |
| Weight, percent | 3.4 | 7.6 | 89.0 | |
| Gms. | 195.0 | 436.0 | 5,085.0 | |
| Wt. percent on polymer plus activator | 4.0 | 8.9 | [1] 59.8 | |
| Vis. at— | | | | |
| 100° F., cs./SSU | | 1,570/7,270 | 251.2/1,164 | 32.0/150 |
| 210° F., cs./SSU | | 56.7/265 | 18.6/92.7 | 5.25/43.5 |
| VI | | | 90 | 104 |

[1] Assuming no conv. of 150 N CS and after subtracting 2,159 gms. 150 N CS.

From the foregoing examples, various fractions were arbitrarily obtained. Appropriate fractions may be obtained to add to the usual petroleum refining processes. For example, a 200°–450° F. fraction may be added to cat naphtha to be processed in the usual manner. More specifically the products from the decomposition process of the present invention are illustrated in two possible alternatives, (1) in the absence of aromatic solvents and (2) in the presence of aromatic solvents. In the absence of aromatic solvents: (a) The fractions boiling below 650° F.+ may be hydrogenated and if necessary, treated to remove sulfur, to produce a highly branched paraffin product. Such a product is an unusual and valuable solvent. (b) The 650° F.+ fraction may be distilled into the usual lube fractions and hydrogenated, if necessary, to produce high quality lube oils with no extraction or dewaxing. (c) Using an aliphatic solvent boiling below about 600° F. in the decomposition process of the present invention, the polymer may be decomposed so that it is just barely soluble at room temperature. After separation of the inorganic solids, then the solvent is distilled to produce a product similar to the Indepoles which are polybutenes and useful as adhesives. When butyl rubber is the polymer, the products are essentially the same. (d) Alternatively, if a high melting petrolatum (170°–195° F.) is used as the solvent and the decomposed polymer and solvent are not separated, a product is obtained after fractionation of the light ends which is similar to the polyolefin and high melting microwax blends used as adhesives and paper coating products. If an aromatic solvent is present in the decomposition process, fractions of predominately aromatics are obtained which are high quality lube materials. Furthermore, the aromatic fractions may be used as specialty oils such as power and communication electrical oils and as viscosity modifiers.

The nature and objects of the present invention having been completely described and illustrated and the best mode thereof set forth, what we wish to claim as new and useful and secure by Letters Patent is:

1. A process for converting waste solid $C_2$ to $C_8$ olefin polymers which are solid at room temperature, containing high concentrations of inorganic material to useful liquid chemicals which comprises:
   (a) heating said solid polymer until it is converted to a liquid state,
   (b) contacting said liquid polymer with a free radical initiator at elevated temperatures to form a decomposition product which is considerably reduced in viscosity and liquid at a considerably lower temperature than the decomposition temperature, and
   (c) physically separating from said liquid decomposition product said inorganic material.

2. A process according to claim 1 wherein said conversion of the solid polymer to the considerably lower viscosity and liquid state is by heating the solid polymer to a temperature in excess of its melting point.

3. A process according to claim 1 wherein said conversion of the polymer to the lower viscosity liquid state is by dissolving the polymer in a solvent with heating.

4. A process according to claim 3 wherein said solvent is a hydrocarbon from cycle stock.

5. A process according to claim 1 wherein said reactor has three stages.

6. A process according to claim 1 wherein said initiator is selected from the group of aromatic sulfides and aromatic disulfides.

7. A process according to claim 1 wherein said initiator is toluene disulfide.

8. A process according to claim 1 wherein said polymer is waste polypropylene.

9. A process according to claim 8 wherein said polymer is heated from 550° F. to 900° F. and is subjected to inorganic separations at a temperature of from 150° F. to 250° F. to convert the solid polymer to a decomposition product of such reduced viscosity that it is liquid.

10. A process according to claim 9 wherein said initiator is toluene disulfide.

11. A process according to claim 1 wherein said liquid decomposition product, after removal of said inorganic material, is distilled into useful chemical fractions.

12. The composition prepared by the process of claim 1.

13. The composition prepared by the process of claim 10.

References Cited

UNITED STATES PATENTS

| | | | |
|---|---|---|---|
| 2,415,449 | 2/1947 | Sverdrup et al. | 260—2.3 |
| 3,070,553 | 12/1962 | Nagle et al. | 260—2.3 |
| 2,915,482 | 12/1959 | Nagle et al. | 260—2.3 |
| 3,070,589 | 12/1962 | Kirch et al. | 260—94.9 |
| 3,112,299 | 11/1963 | Borrows et al. | 260—94.9 |
| 3,344,218 | 9/1967 | Chopra et al. | 260—2.3 |

SAMUEL H. BLECH, Primary Examiner

U.S. Cl. X.R.

260—93.7, 94.9 F, 94.9 GC, 720